(12) United States Patent
Granberg

(10) Patent No.: US 6,996,426 B2
(45) Date of Patent: Feb. 7, 2006

(54) ELECTRONIC DEVICE HAVING A MOVABLE KEYPAD

(76) Inventor: Richard Granberg, Torsgatan 27 SE-113 21, Stockholm (SE)

( * ) Notice: Subject to any disclaimer, the term of this patent is extended or adjusted under 35 U.S.C. 154(b) by 372 days.

(21) Appl. No.: 10/181,522

(22) PCT Filed: Jan. 22, 2001

(86) PCT No.: PCT/SE01/00111

§ 371 (c)(1),
(2), (4) Date: Oct. 21, 2002

(87) PCT Pub. No.: WO01/54384

PCT Pub. Date: Jul. 26, 2001

(65) Prior Publication Data

US 2003/0112225 A1 Jun. 19, 2003

(30) Foreign Application Priority Data

Jan. 21, 2000 (SE) .................................. 0000189

(51) Int. Cl.
*H04M 1/00* (2006.01)
*G09G 5/00* (2006.01)

(52) U.S. Cl. ............... 455/575.4; 455/90.3; 455/575.1; 455/575.8; 345/173; 345/169

(58) Field of Classification Search ............... 455/90.3, 455/550.1, 575.1, 575.4, 575.8; 361/679–680; 200/544; 345/173, 169

See application file for complete search history.

(56) References Cited

U.S. PATENT DOCUMENTS

| 5,742,894 | A | | 4/1998 | Jambhekar et al. |
| 6,003,052 | A | * | 12/1999 | Yamagata .................... 708/100 |
| 6,065,076 | A | * | 5/2000 | Sorenson ..................... 710/72 |
| 6,667,738 | B2 | * | 12/2003 | Murphy ....................... 345/173 |

FOREIGN PATENT DOCUMENTS

| DE | 19622323 C1 | 8/1997 |
| EP | 0924915 A1 | 6/1999 |
| EP | 0928093 A1 | 7/1999 |
| GB | 2337393 A | 11/1999 |
| WO | 9703511 A2 | 1/1997 |

* cited by examiner

*Primary Examiner*—Nick Corsaro
*Assistant Examiner*—Wen Huang
(74) *Attorney, Agent, or Firm*—Birch, Stewart, Kolasch & Birch, LLP

(57) ABSTRACT

An electronic device such as a mobile telephone has a large touch screen display (1). On top of the display a flexible keypad (11) can be pulled up to more or less cover it. The keys (19) of the keypad act at their bottom against the surface of the display and produce, when depressed by the fingers of a user, a pressing force on the surface of the display, that by electronic circuits in the device is translated to a corresponding input figure or letter. The keypad can be the Venetian blind type and comprise lamellae (13) hinged to each other, so that each depressible key is placed completely on a single lamella. Guides (15) for the keypad are arranged at two opposite edges of the display, not allowing any part of the keypad to project outside the general profile of the device when moving the keypad. Such a movable keypad can be easily handled, is robust and not apt to be broken.

15 Claims, 2 Drawing Sheets

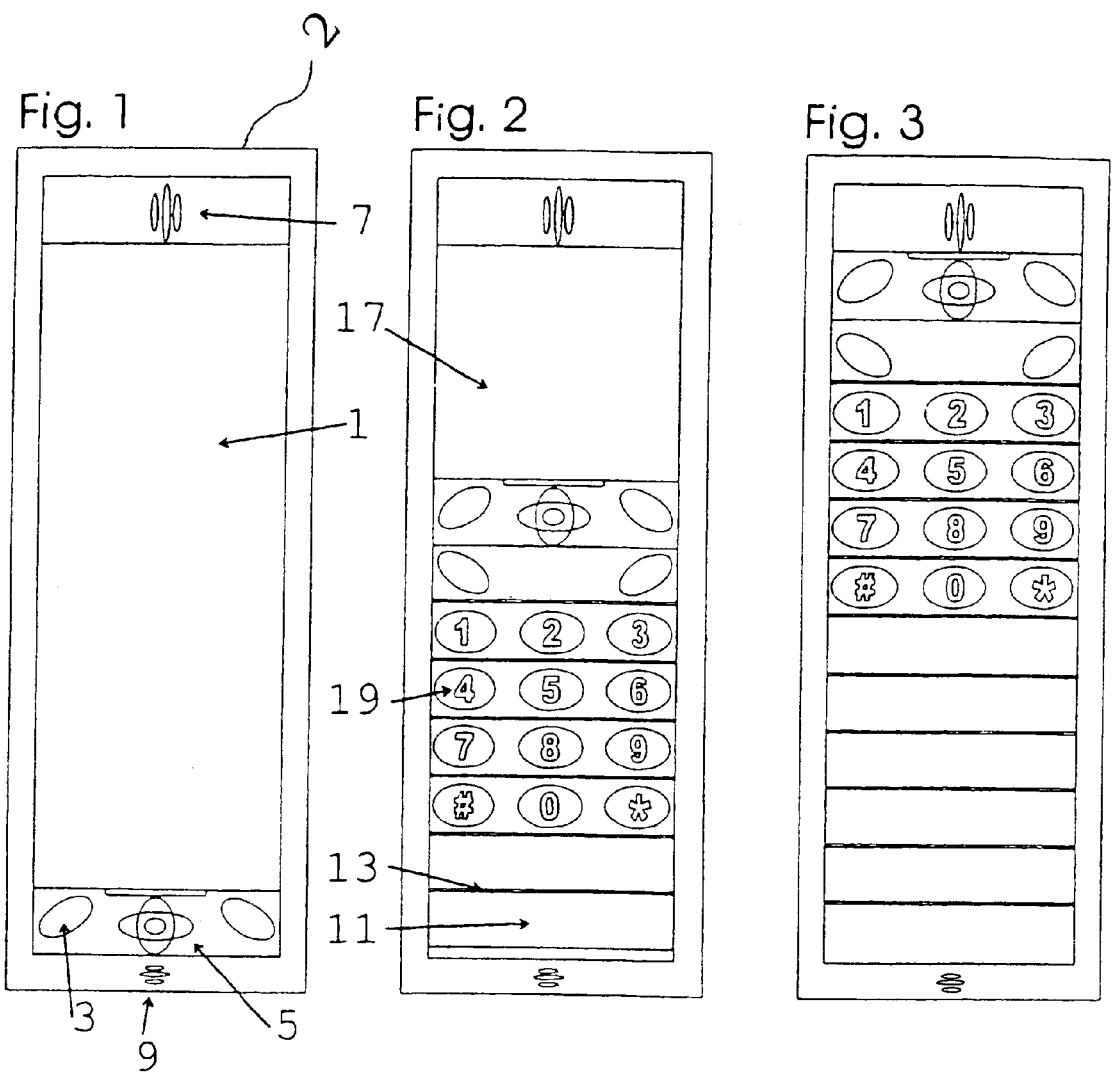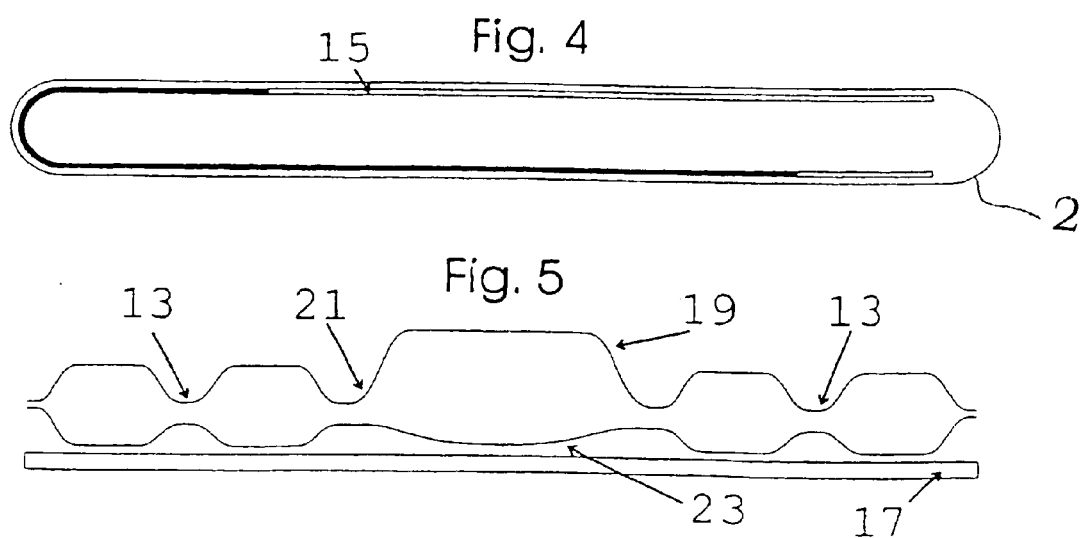

ELECTRONIC DEVICE HAVING A MOVABLE KEYPAD

This application is the national phase under 35 U.S.C. 0 371 of PCT International Application No. PCT/SE01/00111 which has an International filing date of Jan. 22, 2001, which designated the United States of America.

TECHNICAL FIELD

The present invention generally relates to an electronic device such as a mobile telephone and in particular to a movable keypad for such a device.

BACKGROUND

Mobile telephones are more and more used and their functions and possible uses are increased all the time. Thus in mobile telephones for example, there may be a need for a large display allowing a user of the telephone to use it as a terminal when connecting to the Internet and then use some operative system having a more or less graphical interface. Such mobile telephones have also been manufactured and they can then have large display areas covering most of the front surfaces of the telephones. As a display means a pressure-sensitive screen or touch screen is used. On such a telephone no usual depressible buttons or keys for characters are provided but input of characters requires the user to place her/his finger or any other pointing means on the screen according to the symbols displayed thereon. This is true for all input of characters, also when making simple telephone calls. It can be a drawback since the user must all the time look at the display and cannot use the feeling of her/his fingers. It is also difficult for persons having less than normal sight to use such a telephone, since such persons primarily rely on their feeling ability. Furthermore, the large display consumes much energy for its operation, also for simple telephone calls, resulting in that such a mobile telephone can be supplied with power for a shorter time by its battery.

These drawbacks can be reduced by arranging a keypad on a movable flap, that in a closed position covers part of the touch screen and in a folded-up position exposes all of the touch screen, see U.S. Pat. No. 5,742,894. However, movable flaps have the disadvantage of consuming more space when the flap is in a folded-up or pulled-away position and can be easily broken in that position.

SUMMARY

It is an object of the invention to provide an electronic device such as a mobile telephone which has robust facilities for input both via a touch screen and by using a keypad of substantially conventional type.

Generally thus, an electronic device such as a mobile telephone has a large touch screen display, through which input to the electronic circuits of the device can be made. On top of the display a flexible keypad can be pulled to different positions to more or less cover it. The flexible keypad can slide in mechanical guides all the time being located within the outer profile or outline of the housing of the electronic device. For example, when totally exposing the display part of the keypad can be located at the rear side of the electronic device. The keys of the keypad act with their bottom side against the surface of the display and produce when depressed by the fingers of a user, a pressure against the surface of the display, which by electronic circuits in the device is translated to a corresponding input figure or letter. The keypad is preferably the type Venetian blind and can comprise lamellae articulated to each other so that each depressible key is completely placed on a single lamella. Guides for the keypad are then advantageously arranged at two opposite edges of the display, at the edges of the lateral surfaces of the electronic device. The guides can substantially follow the outline or profile of the electronic device when viewed from the side thereof, i.e as seen in a direction parallel to the surface of the display and perpendicular to the movement direction of the keypad such as parallel to the longitudinal direction of the lamellae.

BRIEF DESCRIPTION OF THE DRAWINGS

The invention will now be described as non-limiting embodiments with reference to the accompanying drawings in which:

FIGS. 1, 2 and 3 are front views of a mobile telephone having a Venetian blind device in different positions, FIG. 4 is a sectional view of the mobile telephone taken at a lateral surface thereof, FIG. 5 is a partial sectional view taken through the mobile telephone having the Venetian blind device pulled up.

PREFERRED EMBODIMENTS

Figure 6:
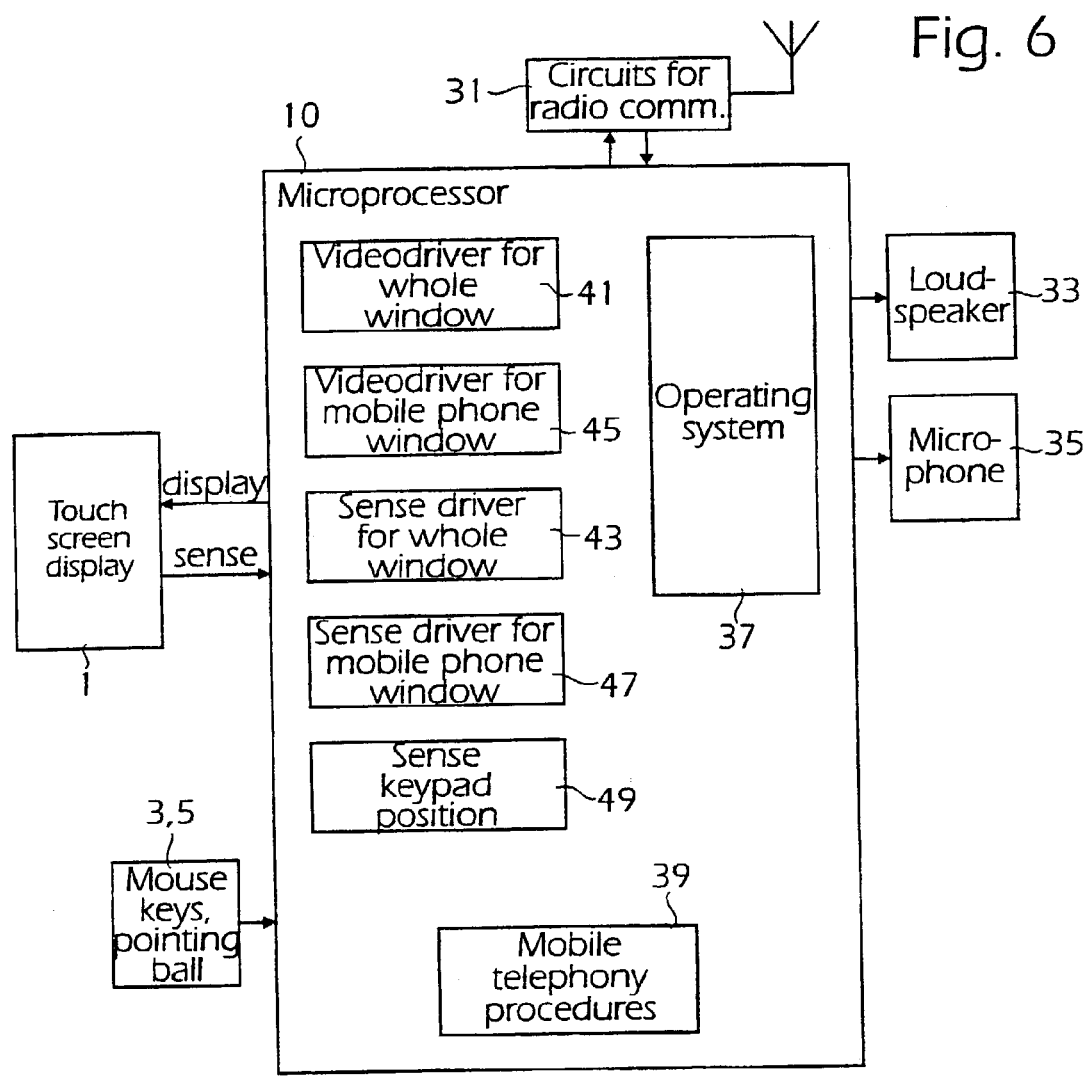
FIG. 6 is a block diagram of electronic circuits comprised in the mobile telephone.

In FIG. 1 a mobile telephone as seen from the front is shown. It comprises a generally rectangular housing 2. Thus, the housing has a rear surface, two lateral opposite surfaces, a top surface and a bottom surface and a front surface opposite the rear surface. On the latter surface, the front surface, a touch screen display 1 is arranged having a rectangular shape and covering most of the area of the front surface. At the bottom of the front surface of the telephone two keys 3 are provided which correspond to the keys of a conventional computer mouse. A control ball 5 or corresponding device is located between the two keys 3 and has a function corresponding to the function of moving a computer mouse. A loudspeaker opening 7 is located at the top of the front surface of the telephone and a microphone opening 9 is located at the bottom.

The telephone comprises microprocessor circuits 10, see the block diagram of FIG. 6, for using some operative system such as for example Windows CE and by means thereof execute various programs and on the display show corresponding images. When using the telephone for telephone calls a respective program is started that for example can show pictures of depressible keys on the display 1. The user presses on these pictures in the same way as on a usual keypad to dial a telephone number of another telephone.

The telephone also has a conventional keypad including depressible buttons or keys. It is designed as a flexible cover and preferably made as a Venetian blind 11 including a number of lamellae 13 hinged to each other, see Figs. 2, 3 and 4. The ends of the lamellae run in mechanical guides 15, see FIG. 4, arranged at the edges of the lateral surfaces of the telephone housing 2. Each guide 15 can be designed as a groove which as seen from the side of the telephone has a U-shape including long legs and a rounded web-portion at the bottom of the telephone housing. The shape of the guides thus substantially agree with or corresponds to the outline of the telephone as seen in a lateral direction, perpendicular to the lateral surfaces.

In the position shown in FIG. 2 the Venetian blind keypad 11 is pulled to such a position that the front side of the telephone resembles the front side of a conventional mobile telephone. At the top a portion 17 of the touch screen display 1 is visible and corresponds to the usual display of a mobile telephone having only a small window for showing characters, i.e. figures and letters. Beneath the visible portion 17 depressible keys 19 are placed on a number of adjacent lamellae 13 of the keypad and they advantageously have a design so that they somewhat protrude from or stand out of the otherwise flat surface of the respective lamella 13. When depressing the depressible keys 19 they press against the hidden portion of the display 11. The driver circuits of the touch screen display, see FIG. 6, has when pulling up the Venetian blind keypad 11 been changed to sense these depressions of the keys in a way substantially corresponding to the way in which a conventional mobile telephone is operated. Furthermore, in the position shown in FIG. 2 the image-displaying elements of the display 11 which are hidden by the Venetian blind keypad have been switched off to reduce the electric power consumption and save the battery capacity.

The Venetian blind keypad 11 can also advantageously be pulled up to the position shown in FIG. 3 to completely hide and protect the display 1. In the completely pulled-away position shown in FIG. 1 the mobile telephone is used only with the touch screen display 1.

The corresponding device having a Venetian blind cover including depressible keys and a touch screen display can of course be used in other devices such as for example pocket and palm computers and other computer terminals which have touch screen displays that can be used for input of data. In particular it is valuable when in some case it is desired to have a keypad of the conventional mechanical type including depressible keys, the positions of which can be distinguished by only the feeling ability in the finger tips of a user.

The lamellae 13 in the Venetian blind keypad 11 can be made from rigid, thick strips having a uniform width, of a plastics material sheet including thinner, flexible narrow portions 20 having a uniform width located between the rigid strips, see also FIG. 5. The depressible keys 19 are in the corresponding way produced in the lamellae by having each key comprise a rigid, thick portion, which at its periphery is connected to the corresponding rigid strip or lamella 11 through an annular, thin, flexible, elastically extendable, narrow, strip-shaped portion 21. The top sides of the depressible keys are designed to be easily felt by the finger tips and their bottom sides, which, for the Venetian blind pulled up, are located at a small distance of the touch screen display 17, can have a localized convex shape 23 in order to easily give, when a key is depressed, a sufficient pressing force on the surface of the display 1. The Venetian blind keypad including the depressible keys could also be formed from a single flexible sheet having an adapted rigidity but including no lamellae formed.

In the embodiment shown all of the keypad 11 is displaced so that its edges are all the time placed in the guides 15. It is also possible to arrange a rolling-up device, not shown, for the keypad at the bottom side of the telephone and then only the lateral edges of the keypad 11 at the top portion thereof are permanently placed in the guides 15 whereas other portions of these lateral edges are more or less pulled into or out of the guides when moving the keypad upwards and downwards respectively.

The position of the flexible cover 11 can easily be sensed by for example arranging a projection, not shown, on the rear side of the top lamella, facing the touch screen display 1, the projection protruding to be constantly in contact with the surface of the touch screen 1. The constant pressing force and its current location is easily detected by is the touch screen drivers. The sensed position can be used for controlling the type of pictures or characters shown on the display 1, for switching off all of or part of the display elements of the display, and for controlling the input from the display such as when to sense the depression of the keys of the movable cover 11. Special sensor elements, not shown, can instead be arranged for the same purpose at for instance the guides 15.

In the block diagram of FIG. 6 some basic elements of the electronic circuitry of the mobile telephone are illustrated. Thus the microprocessor 10 is connected to circuits 31 for radio communication, to the display 1, to the mouse keys 3 and pointing device 5, to the loudspeaker 33 and to the microphone 35. The processor can operate according to some operative system 37 having a graphic interface. The processor contains circuits 39 necessary for mobile telephony including conversion of speech information between digital and analog states. It also contains various drivers 41–47 for the different functions of the touch screen display and can execute a procedure 49 for sensing the position of the flexible cover 11. The drivers of the touch screen can comprise functions 41 for displaying and functions 43 for sensing pressures when the cover 11 is in a completely pulled-away position as in FIG. 1. Furthermore, there may be functions 45, 47 for displaying and sensing when the cover is in the position similar to that illustrated in FIG. 2 to make the mobile telephone operate like a mobile telephone having a conventional keypad. The switch between the drivers 41, 43 and 45, 47 is commanded by the sensing procedure 49.

What is claimed is:

1. An electronic device comprising:
    a touch screen display and associated electronic circuits in a housing for displaying symbols and/or images on the display, and for receiving input for a localized pressure force against a surface of the display;
    a keypad arranged to be moved over the display to bring, when manually depressing keys on the keypad, the keys to act on the surface of the display and thereby produce a corresponding input of figures or letters corresponding to the keys; and
    a pair of U-shaped guides extending around a rear end of the housing of the electronic device,
    wherein the keypad is flexible and has a size adapted to a size of the display, the keypad being arranged to be moved by a user of the electronic device to different positions, including a first position to cover all of the touch screen display, a second position to cover a portion of the touch screen display, or a third position to cover no portion of the touch screen display, and
    wherein the keypad is connected to the device by said pair of U-shaped guides allowing a sliding movement of the keypad in such a way, that when moving the keypad to the different positions, the keypad maintains a shape of the surfaces of the electronic device, and/or is located along a perimeter of the electronic device when seen in a direction perpendicular to a direction of movement of the keypad and parallel to a surface of the touch screen display.

2. The electronic device according to claim 1, wherein the guides are arranged at opposite sides of the display and extend around rear edges of the housing of the electronic device to have a shape seen in the direction perpendicular to the direction of movement of the keypad and parallel to a surface of the touch screen display, substantially agreeing with or being parallel to the outline of the electronic device seen in said direction.

3. The electronic device according to claim 1, wherein the guides arranged at opposite sides of the display and extending around rear edges of the housing of the electronic device, so that when moving the keypad away from the touch screen display, part of the keypad will be located at a bottom side of the electronic device.

4. The electronic device according to claim 3, wherein the guides are arranged so that when moving the keypad totally away from the touch screen displays, part of the keypad will be located at the rear end of the electronic device.

5. The electronic device according to claim 3, wherein the guides are arranged so that when moving the keypad totally away from the touch screen display, part of the keypad will be located at a rear end of the electronic device.

6. The electronic device according to claim 1, in wherein the keypad comprises a plurality of lamellae hinged to each other, the guides for the keypad being arranged at opposite sides of the display for slidably receiving the lamellae.

7. The electronic device according to claim 6, wherein each of the keys is placed on a single lamella.

8. The electronic device according to claim 6, wherein at least some of the plurality of lamellae of the keypad include upper and lower strips, wherein the upper and lower strips are spaced apart at positions corresponding to the keys.

9. The electronic device according to claim 1, wherein the guides extend along opposite top sides of the display of the housing by a distance substantially equal to a distance that the guides extend along opposite bottom sides of the housing.

10. The electronic device according to claim 1, wherein the keypad includes localized convex-shaped portions under the keys of the keypad.

11. The electronic device according to claim 1, wherein the keypad comprises a plurality of lamellae hinged to each other, the guides for the keypad being arranged at the opposite sides of the housing for slidably receiving the lamellae.

12. The electronic device according to claim 11, wherein each of the keys is placed on a single lamella.

13. The electronic device according to claim 11, wherein at least some of the plurality of lamellae of the keypad include upper and lower strips, wherein the upper and lower strips are spaced apart at positions corresponding to the keys.

14. An electronic device comprising:
a touch screen display and associated electronic circuits in a housing for displaying symbols and/or images on the display, and for receiving input for a localized pressure force against a surface of the display;
a keypad arranged to be moved over the display to bring, when manually depressing keys on the keypad, the keys to act on the surface of the display and thereby produce a corresponding input of figures or letters corresponding to the keys; and
a pair of U-shaped guides extending by substantially equal distances along top and bottom side edges on opposite sides of the housing of the electronic device,
wherein the keypad is flexible and has a size adapted to a size of the display, the keypad being arranged to be moved by a user along the guides to different positions, including a first position to cover all of the touch screen display, a second position to cover a portion of the touch screen display, or a third position to cover no portion of the touch screen display, and
wherein the keypad slides along the guides on opposite side edges of the housing in such a way, that when moving the keypad to the different positions, the keypad moves along the opposite top side edges, opposite rear edges, and the opposite bottom side edges of the electronic device when seen in a direction perpendicular to a direction of movement of the keypad and parallel to a surface of the touch screen display, whereby the keypad maintains a shape of the surfaces of the electronic device.

15. The electronic device according to claim 14, wherein the keypad includes localized convex-shaped portions under the keys of the keypad.

* * * * *